April 2, 1963   E. C. CRITTENDEN, JR., ETAL   3,084,339
ANALOG-TO-DIGITAL CONVERTER
Filed Sept. 22, 1959   4 Sheets-Sheet 1

EUGENE C. CRITTENDEN, JR
JOHN N. COOPER
FRED W. SCHMIDLIN
ARTHUR J. LEARN
INVENTORS

BY Jerry G. Dinardo
AGENT
Albert Rosen
ATTORNEY

April 2, 1963  E. C. CRITTENDEN, JR., ETAL  3,084,339
ANALOG-TO-DIGITAL CONVERTER
Filed Sept. 22, 1959  4 Sheets-Sheet 3

EUGENE C. CRITTENDEN, JR.
JOHN N. COOPER
FRED W. SCHMIDLIN
ARTHUR J. LEARN
*INVENTORS*

BY *Jerry A. Dinardo*
AGENT

*Albert Rosen*
ATTORNEY

April 2, 1963  E. C. CRITTENDEN, JR., ETAL  3,084,339
ANALOG-TO-DIGITAL CONVERTER
Filed Sept. 22, 1959  4 Sheets-Sheet 4

EUGENE C. CRITTENDEN, JR.
JOHN N. COOPER
FRED W. SCHMIDLIN
ARTHUR J. LEARN
*INVENTORS*

BY *Jerry G. Dinardo*
AGENT

*Albert Rosen*
ATTORNEY

United States Patent Office 3,084,339
Patented Apr. 2, 1963

3,084,339
ANALOG-TO-DIGITAL CONVERTER
Eugene C. Crittenden, Jr., Monterey, John N. Cooper, Carmel, and Arthur J. Learn and Fred W. Schmidlin, Inglewood, Calif., assignors to Space Technology Laboratories, Inc., a corporation of Delaware
Filed Sept. 22, 1959, Ser. No. 841,572
12 Claims. (Cl. 340—347)

This invention relates to improvements in the art of converting analog electrical signals into corresponding digital electrical signals, and more particularly to a novel arrangement of superconductive switching elements for such conversion purposes.

In the investigation of the electrical properties of materials at very low temperatures it has been found that the eletcrical resistance of many materials drops abruptly as the temperature is lowered to that close to absolute zero (zero degrees Kelvin)—the material in such a state being termed superconductive. That the electrical resistance of a material in a superconductive condition is actually zero or so close to it as to be undetectable by measurement has been well illustrated by experiments at the Massachusetts Institute of Technology where a relatively large current, induced in a lead ring immersed in liquid helium, continued to flow without any detectable decay for a period of over two years.

In data processing and digital computing systems there is a need for electrical components of reduced size and increased speed. In such systems digital information is frequently represented by an electrical current which may be passed through a myriad of electrical circuits to perform computations and manipulations of a complexity and magnitude that would be impractical by any manual means. For example, superconductive digital data handling arrangemens have been proposed that are capable of switching within a millimicrosecond or less. In addition to such high switching speeds, such superconductive elements and arrangements are also characterized by their extreme compactness and by their relative ease of manufacture. However, such previous superconductive data handling arrangements have not proven satisfactory in handling analog information—and while analog-to-digital converters of conventional varieties (that is, of varieties that do not make use of the phenomenon of superconductivity) have been proposed, such a hybrid arrangement leaves a number of things to be desired. For example, the compactness realized through the use of a superconductive digital computer arrangement would be sacrificed in part through the need to resort to analog-to-digital converters of the conventional kind. Then, too, the provision of a superconductive converter construction, for use with superconductive digital data processing arrangements, would also contribute to a more effective utilization of the low temperature equipment needed for the superconductive computer switching elements.

Accordingly, an object of this invention is to provide an improved analog-to-digital converter arrangement that is capable of high speed operation, for example at speeds of the order of microseconds or less per converter switching operation.

Another object of the invention is to provide an improved superconductive electrical circuit that is capable of converting analog electrical information into corresponding digital electrical information at high speeds, such a circuit arrangement being characterized by extreme compactness and relatively great ease of manufacture.

The present invention is based generally upon a property of a superconductive material wherein the material undergoes a transition from a superconductive to a resistive state during the application of an electric current, and reverts to the superconductive state after the current flow ceases. The minimum value of current causing the transition from one state to another, at any given temperature, is termed the critical current. It has been determined that the critical current at any given temperature, for a thin film superconductive element of a given material, is apparently critically dependent upon the width and thickness of the element but not upon its length. Thus, by suitably dimensioning a given superconductive element it may be given any desired critical current value, as well as any desired resistance value in its resistive state.

According to the invention an analog-to-digital converter is provided through the use of a novel arrangement of a plurality of thin film superconductive elements. The elements are physically dimensioned so that each element has a critical current value different from that of any other element. Each element is also dimensioned to have a resistance value determined by the voltage drop desired across the element in its resistive state. When a time varying analog signal current is applied to the converter circuit arrangement, each of the elements is triggered from its superconductive state to its resistive state at a different level of input current so as to produce a sudden rise in output voltage across the element at the moment of triggering. This voltage rise is sensed by voltage responsive means to indicate an "on" condition. When the analog current drops below the value of current necessary to sustain a particular element in its resistive state, the element switches over to its superconductive state, thereby removing the voltage from the element. The removal of voltage from the element is sensed by the voltage responsive means to indicate an "off" condition. Each of the thin film elements is responsive, in change-of-state, to a different current value. Consequently, the voltage response means is actuated in different discrete manners as a function of the elements that undergo a change in state. These different discrete manners of actuation are used to provide correspondingly different discrete or digital output signals.

In the four sheets of drawings, wherein like reference characters refer to like parts.

*Superconductive Phenomena*

Since the arrangements of the invention are predicated upon certain effects peculiar to the phenomena of superconductivity, these effects will be discussed prior to a discussion of embodiments of the invention.

At temperatures near absolute zero some materials apparently lose all resistance to the flow of electrical current and become what appear to be perfect conductors of electricity. This phenomenon is termed superconductivity and the temperature at which the change occurs, from a normally resistive state to the superconductive state, is called the transition temperature. For example, the following materials have transition temperatures, and become superconductive, as noted:

| Material | Degrees Kelvin |
|---|---|
| Niobium | 8 |
| Lead | 7.2 |
| Vanadium | 5.1 |
| Tantalum | 4.4 |
| Mercury | 4.1 |
| Tin | 3.7 |
| Indium | 3.4 |
| Thallium | 2.4 |
| Aluminum | 1.2 |

Only a few of the materials exhibiting the phenomenon of superconductivity are listed above. Other elements, and many alloys and compounds, become superconductive at temperatures ranging between 0° and around 20° Kelvin. A discussion of many such materials may be found in a book entitled "Superconductivity" by D. Schoenberg, Cambridge University Press, Cambridge, England, 1952.

The above-listed transition temperatures apply only where the materials are in a substantially zero magnetic field. In the presence of a magnetic field the transition temperature is decreased. Consequently, in the presence of a magnetic field a given material may be in an electrically resistive state at a temperature below the absence-of-magnetic-field or normal transition temperature. A discussion of this aspect of the phenomenon of superconductivity may be found in U.S. Patent 2,832,897, entitled "Magnetically Controlled Gating Element," granted to Dudley A. Buck.

In addition, the above-listed transition temperatures apply only in the absence of electrical current flow through the material. When a current flows through a material, the transition temperature of the material is decreased. In such a case the material is in an electrically resistive state even though the temperature of the material is lower than the normal transition temperature. The action of a current in lowering the temperature at which the transition occurs (from a state of normal electrical resistivity to one of superconductivity) is similar to the lowering of the transition temperature by a magnetic field.

Accordingly, when a material is held at a temperature below its normal transition temperature for a zero magnetic field, and is thus in a superconductive state, the superconductive condition of the material may be extinguished by the application of an external magnetic field or by passing an electric current through the material.

Figure 1:
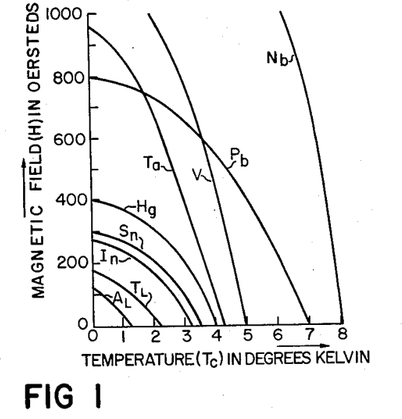
FIG. 1 is a graph illustrating the variation in transition temperatures for various materials as a function of the magnetic field to which they are subjected.

FIG. 1 illustrates the variation in transition temperatures ($T_c$) for several materials as a function of an applied magnetic field. In the absence of a magnetic field, the point at which each of the several curves intersects the abscissa is the transition temperature at which the material becomes superconductive.

The transition temperature is given in degrees Kelvin. The particular material is superconductive for values of temperature and magnetic field falling beneath each of the several curves, while for values of temperature and magnetic field falling above a curve, the material possesses electrical resistance.

Figure 2:
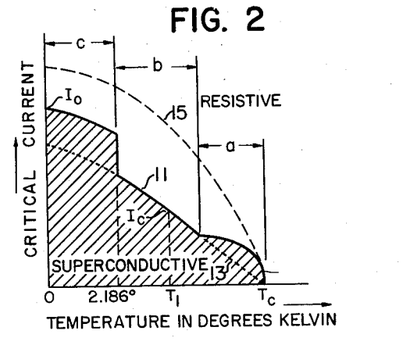
FIG. 2 is a graph of the transition temperature of indium as a function of electric current passed through the material.

Since a current flowing in the material has an effect upon the transition temperature that is similar to the effect of a magnetic field, the passage of a current through superconductive materials will yield curves similar to those shown in FIG. 1. It has been found that if the material is in the bulk form of a cylindrical wire, the transition curve relating critical direct electric current and transition temperature is relatively smooth; the dashed line curve 15 of FIG. 2 illustrates such a relationship for an indium wire element immersed in liquid helium. However, if the superconductive element takes the form of a relatively thin film, the shape of the curve relating critical current and transition temperature is somewhat different. The thin film relationship curve is illustrated in FIG. 2 by a solid line 11. This line 11 illustrates the effect of varying a steady direct electric current through a thin film superconductive element made of indium, and immersed in a liquid helium bath. At any given temperature $T_1$, for example, the element becomes resistive as current is increased above a critical direct current value $I_c$.

In FIG. 2, three different temperature regions have been observed in connection with the phenomena depicted by line 11. In the first region (a), a temperature region immediately below the critical temperature $T_c$ (which is about 3.4 degrees Kelvin for indium in thin film form), complete transition of the film from the superconductive to the resistive state is preceded by localized transitions within the film. These localized transitions, which are thought to be due to mechanical imperfections in the film, occur at current densities or levels somewhat lower than the levels associated with solid line 11 critical current curve. These somewhat lower transition current levels are illustrated by the dashed line 13. In the second temperature region (b), any localized transition is followed by a complete transition of the entire film at the same current level.

In the third region (c), the region below 2.186 degrees Kelvin (the lambda point of helium), localized transitions of the film to the resistive state occur at current densities slightly lower than the current densities required for complete transition of the entire film. The lower current level required for the initiation of localized transition in this third region (c) is indicated in FIG. 2 by the dashed line 13. The explanation for the phenomenon experienced in the third region (c) operation appears to be based upon the fact that at a temperature at and below the lambda point temperature, liquid helium becomes an almost perfect heat conductor. The switching speed of a superconductive element operated at a temperature below the lambda point is observed to be substantially higher than the switching speed of the superconductive element operated at a temperature above the lambda point.

Operation in the third region (c) of the solid line curve 11 of FIG. 2 follows approximately the function $$\frac{I_c}{I_0} = 1 - \left(\frac{T}{T_c}\right)^4$$

where $I_c$ is the critical current level for effecting a transition from the superconductive to the resistive state at any given temperature T, $I_0$ is the intercept of the curve on the vertical axis (at zero degrees Kelvin), and $T_c$ is the transition temperature of the particular superconductive material used.

It has been found, for temperatures above the lambda point, that a superconductive element switches back from its resistive state to its superconductive state at a current level below the current level required for switching to its resistive state. The reason for the foregoing appears to be that, once the superconductive element is switched to its resistive state, the continued passage of current through the superconductive element causes the element to heat and drift in temperature to a temperature somewhat above its former temperature in the superconductive state. Since the critical current level is lower at higher temperatures (FIG. 2), the superconductive element switches back to a superconductive state at a lower current level. However, at temperatures below the lambda point, the high heat conductivity of the liquid helium (of the order of meters per second at temperatures slightly below the lambda point) will maintain the superconductive element at a substantially constant temperature throughout switching operation and tend to minimize the difference between the two switching current levels. Of course, if the switching current levels are high enough to give rise to localized higher than lambda point temperatures (for example high enough to give rise to localized higher than lambda point heating of the element or localized surface anomalies in the helium), the resistive-to-superconductive switching would require a lower current level, as explained above in connection with above lambda point operation.

The switching of a superconductive element by the application of a steady state direct electric current of magnitude just sufficient to cause the superconductive-to-resistive transition is believed to be initiated by the localized switching of one or more regions of the element, perhaps in the vicinity of a physical imperfection. Once the localized region switches, resistive heating of the switched region by the continued passage of current is believed to cause the boundaries of the region to move and enlarge to other regions until the entire element becomes resistive. The motion of boundaries is believed to be primarily responsible for the time delay in switching from superconductive to resistive states. For temperatures above the lambda point, the time delay is about 100 microseconds per millimeter of element length. For temperatures below the lambda point, the time delay is about 1 microsecond per millimeter of length.

If a pulse of current of magnitude greater than the minimum steady direct current required for switching is applied to a superconductive element, the speed of propagation of the boundaries is dependent on the pulse amplitude. The velocity of the boundaries increases with increased pulse amplitude until an amplitude is reached such that the switching takes place without apparent boundary motion. Although switching is not instantaneous with the application of a pulse, the switching does occur within a much shorter time as compared to direct current switching. For this type of pulse switching, the curve relating critical current pulse amplitude and temperature is a smooth one, as shown in the broken line curve 15 of FIG. 2. This curve 15 follows approximately a fourth power function similar to that described above in connection with the operation of the third region (c) of the solid line curve 11. The irregularities in the transition curve that are characteristic of steady direct current switching (curve 11) are not present in the transition curve resulting from pulse switching (curve 15), probably because thermal effects contribute far less to the transition process in pulse switching and, in pulse switching, transition in state occurs primarily through internally generated magnetic fields attendant the flow of pulse current through the superconductive element.

Figure 3:
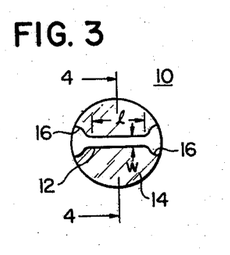
FIG. 3 is a plan view of a representative thin film superconductive device useful in practicing the invention.
Figure 4:
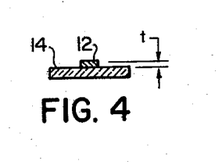
FIG. 4 is a sectional view taken along line 4—4 of FIG. 3.

FIGS. 3 and 4 illustrate a representative thin film superconductive device 10. The device 10 comprises a superconductive element 12 in the form of a vacuum deposited, metallic film of generally rectangular shape, mounted on a glass substrate 14. The element 12 is provided with widened ears 16 at its ends to serve as terminals for connection to a voltage source (not shown). Such an element 12 may typically have a width dimension ($w$) of 60 microns, a thickness dimension ($t$) of 0.1 micron, and a length ($l$) of 7 millimeters.

Figure 5:
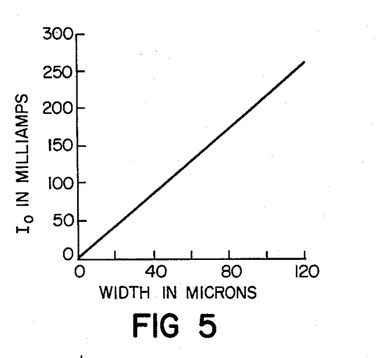
FIG. 5 is a graph illustrating the variation in critical current of a superconductive element as a function of the width of the element.
Figure 6:
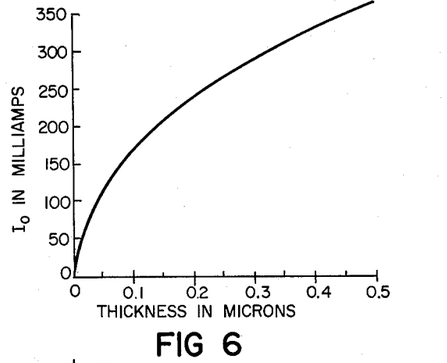
FIG. 6 is a graph illustrating the variation in critical current of a superconductive element as a function of the thickness of the element.

The invention is predicated on the discovery that, at any given temperature, the critical superconductive-to-resistive switching current of a thin film superconductive element (such as the one shown in FIGS. 3 and 4) is a function of the width and thickness dimensions of the element but is substantially independent of the length of the element. This holds true both in those cases where a steady direct current is applied to the element, as well as in those cases where current pulses are applied to the element. FIG. 5 is a graph illustrating the variation of the zero degree Kelvin value of critical current, $I_0$ (as defined above in connection with steady direct current switching) as a function of the width ($w$) of an indium superconductive element having a thickness of .06 micron. FIG. 6 is a graph illustrating the variation of zero degree Kelvin value of critical current, $I_0$ as a function of the thickness ($t$) of an indium element having a width of 60 microns. As shown in FIG. 5, the zero degree critical current, $I_0$, varies linearly with width. As shown in FIG. 6, the zero degree critical current, $I_0$, varies non-linearly with thickness.

Figure 7:
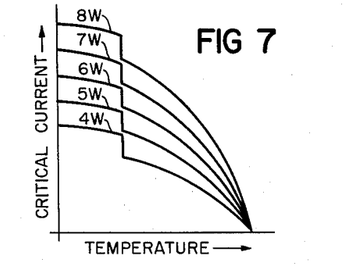
FIG. 7 is a graph illustrating the variation in critical current with temperature for superconductive elements of different widths.
Figure 8:
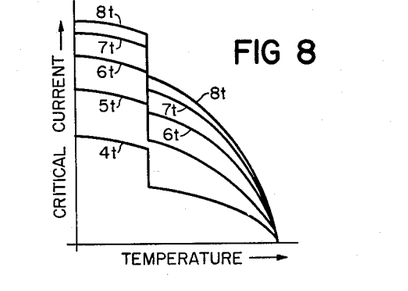
FIG. 8 is a graph illustrating the variation in critical current with temperature for superconductive elements of different thicknesses.

The general shape of the curves relating critical current as a function of temperature (FIG. 2) remains the same as the width and thickness dimensions are varied. Thus, a family of curves can be drawn, relating critical current and temperature, for superconductive elements of the same material but of different widths ($w$), as shown in FIG. 7, and of different thicknesses ($t$), as shown in FIG. 8. For illustration, the curves shown in FIGS. 5 through 8 are those for steady direct current switching, with the irregularity occurring at high temperatures (region ($a$) of FIG. 2) being smoothened for the sake of clarity. Accordingly, a superconductive element can be designed to have any one of a number of critical current values, at any given temperature, by choosing the proper width and thickness dimensions. Similarly, a superconductive element can be designed to have any one of a number of resistance values in the resistive state by selecting the appropriate length, width, and thickness dimensions, with the length being available for varying the resistance value without varying the critical current. Then, too, a further design parameter that can be varied, to secure superconductive elements with different characteristics, is that of the material used; for example, similarly dimensioned superconductive elements of different materials have different normal-state resistance values.

In accordance with the principles stated above, an arrangement of superconductive elements can be provided which will respond to different current levels of a time varying electrical current signal. Such an arrangement can advantageously be used as an analog-to-digital converter.

*Analog-to-Digital Converter Arrangements*

Figure 9:
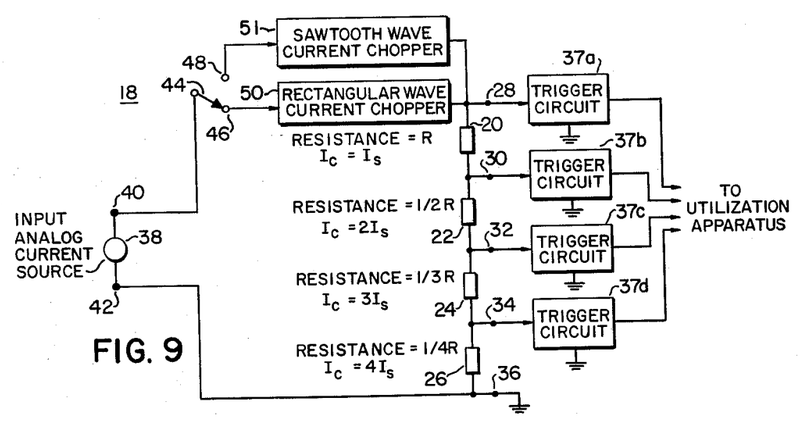
FIG. 9 is a schematic representation of an analog-to-digital converter according to the invention.

FIG. 9 illustrates one example of an analog-to-digital converter 18 according to the invention. In the converter 18 a number of superconductive elements (of which four only are shown for illustration), designated 20, 22, 24, and 26, are connected in series across a pair of output terminals, 28 and 36, one terminal 36 being maintained at a ground reference potential. Other terminals 30, 32, and 34 are also provided at each of the junctions of the superconductive elements 20, 22, 24, and 26 so that an output voltage can be taken from each of the junctions in the series arrangement. A plurality of voltage responsive or bistable trigger circuits 37a, 37b, 37c, 37d are connected to the junction terminals 28, 30, 32, and 34 to sense the voltages at those terminals. Each of these trigger circuits 37a through 37d may comprise any of the well known conventional multi-vibrator or flip-flop circuits. Alternatively, superconductive versions of such circuits (described, for example, in the aforementioned U.S. Patent 2,832,897) may be used. A source 38 of analog signal current is connected across a pair of input terminals 40 and 42 and in series with the superconductive elements 20 through 26 through a single pole double throw switch 44 having terminals 46 and 48. When the switch 44 is connected to one of the terminals 46 the current source 38 is connected to the superconductive elements 20 through 26 in series with a rectangular wave current chopper 50. When the switch 44 is connected to the other switch terminal 48 the current source 38 is connected to the superconductive elements 20 through 26 in series with a sawtooth wave current chopper 51. The current choppers 50 and 51 are used for the purpose of assuring that the superconductive elements will switch on and off at the same critical current value. They function to periodically interrupt the analog current fed to the converter 18. By interrupting the current, for example at a rate of 500 cycles per second, the superconductive elements are permitted to cool down (in their resistive state) during the dwell period so as to prevent the temperature of the elements from increasing and thus prevent a shift to a lower critical current value, as previously described.

Figure 17:
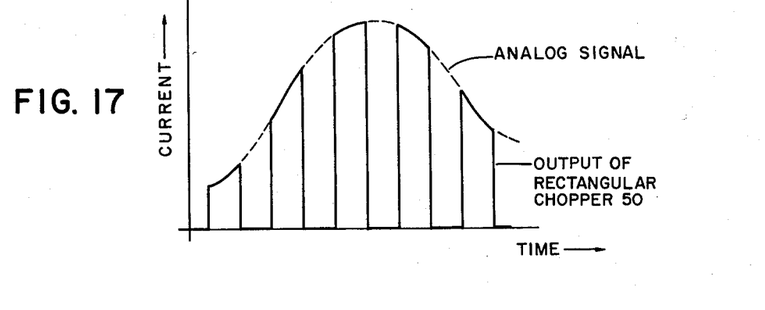
FIGS. 17, 18a, and 18b are graphs of waveforms useful in describing the operation of the converters of FIGS. 9 and 12.

The operation of the converter 18 of FIG. 9 will first be described with the switch 44 connected to the rectangular wave current chopper 50. The input current to the superconductive elements 20 through 26 is thus a series of wide rectangular current pulses, for example 500 microseconds in duration, with an envelope corresponding to the input signal, as shown in FIG. 17. It is assumed in this embodiment that the current pulses fed to the converter 18 are long enough in duration to permit switching of the superconductive element in the element array for which the applied current pulse just exceeds its critical current. Under these conditions the superconductive elements 20 through 26 are operated effectively in the steady direct current mode, represented by the solid curve 11 (FIG. 2). Where it is desired to operate the elements in accordance with fast pulse switching, for example as represented by dashed line curve 15 of FIG. 2, the rectangular chopper 50 would be operated at a faster rate. In accordance with this embodiment, the superconductive elements 20 through 26 are designed to switch at mutually different critical current levels. For example, the first element 20 is designed to switch at a first critical current level $I_s$, the second element 22 at a higher current level $2I_s$, the third element 24 at a still higher current level $3I_s$, and the fourth element 26 at the highest current level $4I_s$. In addition, the elements 20 through 26 are designed to have resistances in their respective resistive states that are inversely proportional to their critical current values. Thus the first element 20, which switches at the lowest current level $I_s$, has the highest resistance, for example a resistance value R. The second element 22, which switches at the next higher current level $2I_s$, has a lower resistance value ½R; the third element 24, which switches at the next higher current level $3I_s$, has a still lower resistance value ⅓R; and the fourth element 26, which switches at the highest current level $4I_s$, has the lowest resistance value ¼R.

Figure 10:
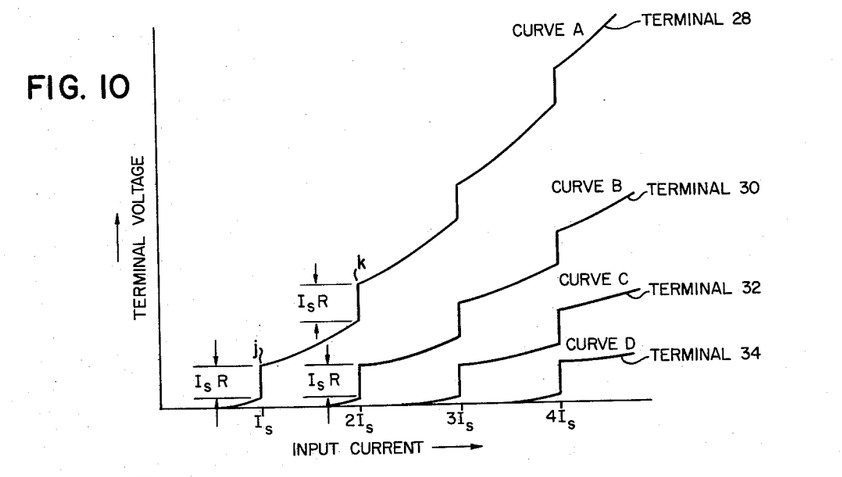
FIG. 10 is a graph of voltage waveforms illustrating the operation of the converter of FIG. 9.

The voltage appearing at each of the element junction terminals 28 through 34 as a function of input current is graphically illustrated in FIG. 10. It can be seen that there is substantially no appearance of voltage at any of the junction terminals 28 through 34 until a minimum current level $I_s$ is reached; the reason for this is that all of the superconductive elements are in their superconductive or zero resistance states at current levels below level $I_s$. What little voltage does appear below the lowest critical current level $I_s$ is due to localized resistance transitions that occur in the element at low threshold steady current levels prior to the complete transition of the element to its resistive state, as described previously. However, such premature appearances of voltage, associated with each of the superconductive elements, does not appreciably affect the operation of the converter.

When the current value reaches the lowest critical current level $I_s$ the first superconductive element 20 will switch to its resistive state (in about 10 microseconds or less), its resistance being equal to a value R. The voltage across the first element 20 will abruptly jump to a value equal to $I_sR$, as shown at point $j$ in curve A of FIG. 10. Since the current level at point $j$ is below the critical current level for each of the other superconductive elements 22 through 26, these other elements will remain in a superconductive state and no voltage will appear across these elements. Thus, the lower end of the first element 20 (terminal 30) will effectively be at ground reference potential, and a voltage will appear only at the first or uppermost junction terminal 28 in FIG. 9.

As the input current increases, the voltage at the uppermost terminal 28 will increase in the same proportion until the input current reaches a level $2I_s$ equal to the critical current for switching the second superconductive element 22 to its resistive state. At this point the second element 22 will switch to its resistive state with its resistance then equal to ½R. As shown in curve B, the voltage at the second terminal 30 will then abruptly jump to a value equal to the voltage drop across the second element 22, namely $(2I_s)(½R)$, or the same value of voltage that previously appeared at the first terminal 28. Since the voltage appearing at second terminal 30 will also appear at the first terminal 28, the potential of the first terminal 28 will likewise abruptly jump by the same value $I_sR$, as shown in curve A, to a new value (the value at point K).

As the input current is further increased, the voltage at each of the first two terminals 28 and 30 gradually rises, with the voltage at first terminal 28 now rising at a faster rate than previously, and faster than the rise in voltage at the second terminal 30. The rise in voltage at the second terminal 30, however, is slower than the rise previously occurring at the first terminal 28 due to the difference in the resistances of the first two superconductive elements 20 and 22.

In a similar manner, the other superconductive elements 24 and 26 will switch to their resistive states when the input current reaches levels of $3I_s$ and $4I_s$, respectively, as shown in curves C and D of FIG. 10. The switches of these superconductive elements 24 and 26 to their resistive states give rise to steep voltage pulses equal to $I_sR$ at each of the remaining junction terminals 32 and 34. When the current level drops below the critical current level of any one of the superconductive elements 20 through 26, the voltage associated with that element will drop to zero. Thus, the presence or absence of a voltage at each of the output terminals 28 through 34 will provide an indication as to whether or not the analog signal current applied to the converter input terminals 40 and 42 has reached a particular level.

In the embodiment shown in FIG. 9 the first voltage pulse occurring at each of the junction terminals 28 through 36 is used to excite an associated trigger circuit 37a through 37d to indicate an "on" condition (that is, a condition or state of resistivity) corresponding to the particular current level at which the pulse occurred. Any tendency toward premature appearance of voltage prior to the pulse to be detected can be rendered ineffective by an appropriate biasing of the trigger circuits.

Figure 18:
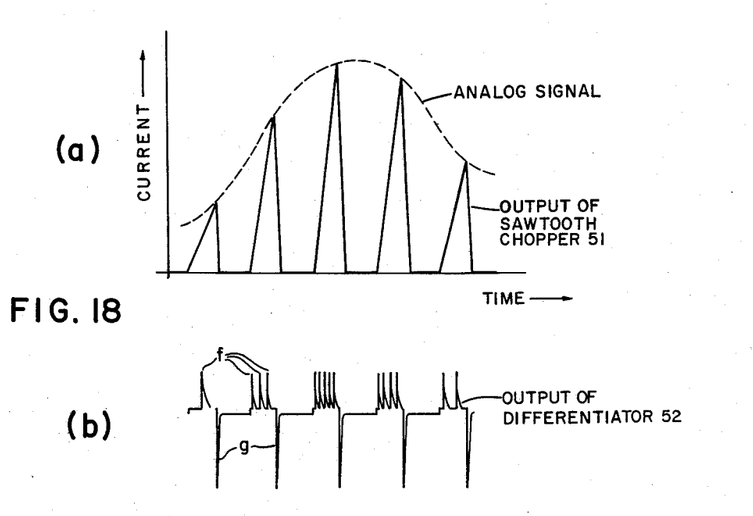

Alternatively, a different arrangement may be used for sensing the occurrence of the series of voltage pulses occurring at the uppermost junction terminal 28 of the apparatus of FIG. 9. In this alternate arrangement the switch 44 is moved to the second switch terminal 48 so as to connect the sawtooth wave current chopper 51 in series with the superconductive elements 20 through 26. The function of the sawtooth chopper 51 is to convert the analog signal current into a series of sawtooth current pulses, with the envelope of the pulses corresponding to the input signal, as shown in FIG. 18a. Such a chopper may, for example, comprise a sawtooth generator (not shown) which is modulated by the input analog signal. Furthermore, in place of the trigger circuits 37a through 37d of FIG. 9, a differentiator 52 (FIG. 11) may be connected across the first and last junction terminals 28 and 36 of the converter 18. The differentiator 52 of FIG. 11 may comprise one of the simple, well known series capacitance and resistance circuits having a very small time constant. The output of the differentiator 52 is fed to a counter 54. As will be explained, two oppositely oriented rectifiers 53 and 55 and a counter reset 57 are connected between the differentiator 52 and the counter 54 to control the operation of the counter.

Figure 11:
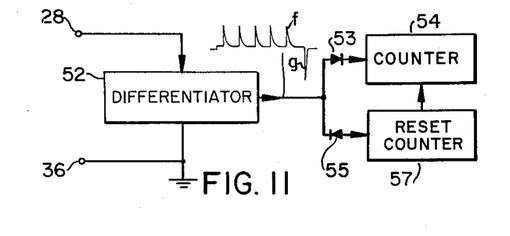
FIG. 11 is a block diagram of a voltage responsive means useful in connection with the converter arrangement of FIG. 9.

Referring to FIGS. 9 and 11 for a description of the operation of this embodiment, for each cycle of sawtooth analog current fed to the converter 18, a number of superconductive elements will be sequentially triggered to the resistive state, the number of elements triggered being dependent upon the amplitude of the sawtooth wave and thus upon the level of analog current during that particular interval of time. Each triggering of the superconductive elements will be accompanied by a voltage rise, at the first junction terminal 28, of the character described in connection with FIG. 10. At the end of the cycle, when the current drops to zero, all of the superconductive elements will be triggered off, that is, will return to their superconductive states. The elements will remain off during the dwell period and will be allowed to cool before the next cycle is initiated. Each time an element is triggered on, the differentiator 52 (FIG. 11) will convert the attendant voltage rise into a sharp positive pulse or pip. This positive pulse $f$ is fed from the differentiator 52, through the first rectifier 53 to the counter 54. Thus the number of positive pulses $f$ occurring during any one cycle, as shown in FIG. 18b, is a measure of the number of elements triggered into a resistive state, and is thus a measure of the level of the analog current during that interval. At the end of the cycle a negative pulse $g$ will result from the current dropping to zero. The second rectifier 55 is connected to pass this negative pulse $g$ to a counter reset 57, the reset being connected to the counter 54 to stop and reset it for the next cycle only upon the receipt of a negative pulse $g$. The counter 54 is arranged to sum up only the positive pulses $f$ so as to provide a count indicative of the current level during any one time interval.

While the two rectifiers 53 and 55 have been described as being any of the conventionally known rectifiers, such as one of the conventional silicon diode types, it is to be appreciated that superconductive rectifying arrangements may instead be used in order to increase the compactness of the converter and improve the over-all efficiency of it. Thus, for example, these rectifiers 53 and 55 may take the form of superconductive elements connected so that they present a substantially zero impedance to the flow of electric current of one polarity, and a relatively high impedance to the flow of current of an opposite polarity. Magnetically controlled superconductive rectifiers are discussed generally, for example, in U.S. Patent 2,666,884, "Rectifier and Converter Using Superconduction," granted to Eric A. Ericsson, et al. While a magnetically controlled rectifying arrangement is discussed in this patent, a more compact, electrically controlled arrangement will be described in connection with FIG. 19.

Figure 19:
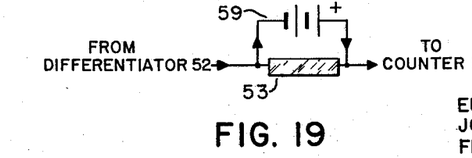
FIG. 19 is a schematic representation of a superconductive rectifier useful in practicing the invention.

The rectifier 53 of FIG. 19 takes the form of a thin film, elongated superconductive element, for example an elongated thin indium film a fraction of a micron in thickness, a few microns in width, and a few millimeters in length. A high impedance direct current source 59 is connected to continuously pass current in one direction through the length of the superconductive rectifier element 53, with the magnitude of the biasing current being selected to be such that, at the normal operating temperature of the element, the element is subjected to a biasing current just insufficient to switch it to its resistive state. When an electric signal current is applied to the rectifier element 53, as from the differentiator 52 of FIG. 11, currents of the same polarity as that of the biasing current will cause the element to switch to its resistive state and thus subject the applied current to the normal resistivity of the rectifier element. However, applied signal currents having a polarity opposite that of the biasing current will tend to cancel at least part of the biasing current, thereby allowing the element to remain in its superconductive state. In its superconductive state the rectifier element 53 exhibits a zero resistivity and allows the applied signal to pass through it substantially unimpeded. One indium rectifier element 53 useful in practicing the invention has a width of 5 microns, a thickness of 0.06 micron, and a length of 7 millimeters. In its resistive state the element exhibits a resistance of 72 ohms. (In its superconductive state, of course, the element exhibits no measurable resistance.) Thus, applied signals of one polarity are subjected to a resistance of 72 ohms, while signals of an opposite polarity are not subjected to substantially any resistance. With these dimensions, the biasing current required of the biasing current source 59 is of the order of 9 milliamperes for an indium superconductive element maintained at a temperature of 2° Kelvin, 6 milliamperes at a temperature of 2.3° Kelvin, 2 milliamperes at a temperature of 3° Kelvin, and 0.8 milliampere at a temperature of 3.3° Kelvin.

While the rectifier element 53 has been described as being biased at a current level just short of that required to switch the element to its resistive state, it is to be realized that the element 53 may instead be operated by biasing it at a level such that it is normally in its resistive state; in this case, too, applied currents of one polarity will be subjected to resistivity while applied currents of the opposite polarity will effect a switching to a superconductive state. This mode of operation, however, is not preferred. The reason for this is that, if the element 53 were normally biased to the resistive state, heat would be generated by the resultant continuous current flow. Then, too, the continuous subjection of the rectifier element 53 to current flow may tend to burn out the element, especially if its local surroundings interferred with free convection of liquid helium.

In the analog-to-digital converter embodiments above described the superconductive elements are designed to have resistance values in their resistive states which are inversely proportional to their critical current values in order to obtain voltage pulses which are uniform in height. However pulses of non-uniform height may be obtained, if desired, by designing the elements to have resistance ratios differing from the critical current ratios. Furthermore, while a converter may be designed to respond linearly to the input analog current by designing the elements so that their critical current values are related in a linear fashion, the elements may also be designed with cirtical current values that are related logarithmically or in any other non-linear fashion so that the converter will respond to the input current in any desired fashion. For example, the critical currents may be related logarithmically as follows, $I_s$, $2I_s$, $4I_s$, $8I_s$, etc.

As described previously, the superconductive elements of a converter according to the invention can be dimensioned to provide any desired value of critical current and resistance. According to one design procedure, for example, the elements can all be made of the same material, such as indium, tin, or lead. They may be designed with different thicknesses and/or widths to obtain the required critical current values. (For example, elements having film thicknesses of less than .01 micron can be used.) Once the critical current values are obtained, the lengths may be adjusted for the proper resistance value. Specific critical current versus element dimension relationships will be discussed as applied to indium elements. However, since critical current values are of the order of about 10 percent greater for tin than for indium, these relationships are also generally true for tin elements with this greater current value adjustment.

In the chart below are listed representative design figures for a converter of the kind illustrated in FIG. 9. The chart lists four elements 20, 22, 24, and 26 made of indium, each element having a length of 7 millimeters and a thickness of 0.06 micron. The elements here differ only in their width. The table lists the values of resistance (while in a resistive state) and also the values of critical current in milliamperes at four different temperatures, namely at 2° K. (below the lambda point of helium), 2.3° K., 3.0° K., and 3.3° K., the latter three temperatures being above the lambda point.

| Fig. 9 Element | Dimensions | | | Critical Current (Milliamperes) | | | |
|---|---|---|---|---|---|---|---|
| | Width in Microns | Thickness in Microns | Resistance in Ohms | 2.0° K. | 2.3° K. | 3.0° K. | 3.3° K. |
| 20 | 30 | 0.06 | 12.0 | 57.5 | 40.5 | 13.2 | 5.2 |
| 22 | 60 | 0.06 | 6.0 | 115 | 81 | 26.3 | 10.4 |
| 24 | 90 | 0.06 | 4.0 | 172.5 | 121.5 | 39.5 | 15.6 |
| 26 | 120 | 0.06 | 3.0 | 230.0 | 162.0 | 52.7 | 20.8 |

Greater latitude in establishing the proper critical current and resistance values can be obtained by making the elements of different materials. As stated previously, different materials have different critical current values and different resistivities. Thus, both a variation in critical current value and a variation in resistivity can be obtained by varying the material of the elements, with the desired values of critical current and resistance ultimately being determined by the dimensions of the elements.

Figure 12:
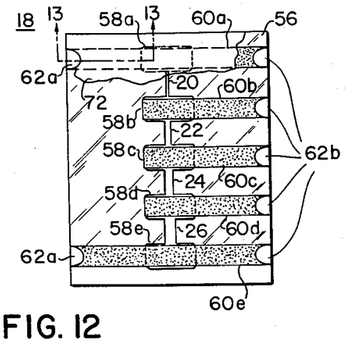
FIG. 12 is a partially cut-away plan view of one construction of a converter of the invention.
Figure 13:
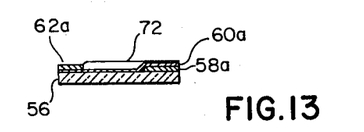
FIG. 13 is an enlarged sectional view taken along line 13—13 of FIG. 12.

One example of a construction of an analog-to-digital converter 18 according to the invention is shown in FIGS. 12 and 13. The superconductive elements 20 through 26 of the converter 18 are mounted in a substantially linear array on a thin glass substrate 56. The elements 20 through 26 are in the form of thin, relatively narrow, elongated strips of metal of varying widths. The elements 20 through 26 are each provided with widened ears (58a through 58e), the ears serving to electrically connect the superconductive elements together and to make electrical connections between the elements and a plurality of substantially parallel thin strip conductors (60a through 60e) extending across the elements. End portions of the two outermost conductors 60a and 60e extend to one edge of the glass substrate 56 and have metal tabs 62a to serve as input terminals while the opposite end portions of all the conductors 60a through 60e extend to the opposite edge of the glass substrate 56 and have metal tabs 62b that serve as output terminals. The elements 20 through 26 are preferably made of indium, while the conductors 60a through 60e are preferably made of some other superconductive material, such as lead (Pb), having higher superconductive-to-resistive transition temperatures than those of the superconductive elements to be switched.

Figure 14:
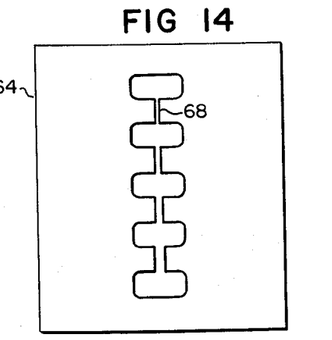
FIGS. 14 and 15 are plan views of apertured masks useful in fabricating the converter shown in FIGS. 12 and 13.
Figure 15:
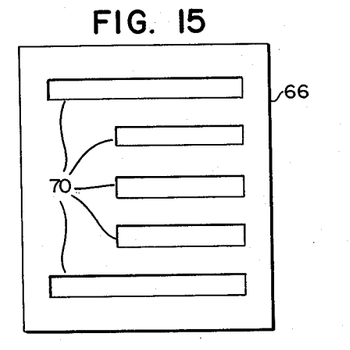

The superconductive elements 20 through 26 and conductors 60a through 60e may be fabricated by evaporating the two metals, in vacuum, through appropriately formed masks 64 and 66 (FIGS. 13 and 14). One of the masks, for example the mask 64 shown in FIG. 13, has openings 68 corresponding in shape to that of the superconductive elements 20 through 26 and ears 58a through 58c. This mask 64 is first laid down over the glass support sheet or substrate 56 and the indium metal is vacuum deposited on the substrate to form the superconductive elements and ears. The first mask 64 is then replaced by the second mask 66, which has elongated slits 70 corresponding to the shapes and positions of the conductors 60a through 60e. With the slits 70 properly registered with the elements 20 through 26 on the supporting substrate 56, the lead (Pb) metal is vacuum deposited through the second mask 66 onto the support plate 56 to form the conductors 60a through 60e.

The indium and lead (Pb) metals can be contained in separate evaporation boats (not shown) within the same evacuation chamber (not shown) so as to carry out the deposition steps most expeditiously. The depositions are carried out in a vacuum preferably of the order of 1 to 10 times $10^{-7}$ millimeters of mercury or lower. The indium should be deposited at a rate of about 50 angstrom units per second or greater to avoid impurity contamination of the superconductive films by co-deposition of residual gas atoms. The supporting substrate should be maintained relatively cool during deposition to insure good adherence of the superconductive films thereto. Satisfactory films have been made by maintaining the supporting substrate at a temperature of the order of 120° Kelvin during the vacuum deposition.

Where lead (Pb) is used as the material for the conductors 60a through 60e it has been found advantageous to electroplate or otherwise apply the tabs 62a and 62b from a material that exhibits a high electrical conductivity, such as copper, to insure good electrical contact with the conductors. In addition, after the deposition has been effected, the resulting assembly (except for the copper tabs 62a and 62b to which electrical access is desired) is given a protective lacquer coating 72 to prevent the lead (Pb) from oxidizing when exposed to the atmosphere.

Figure 16:
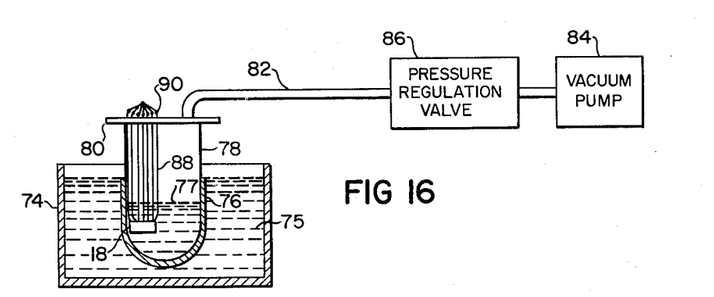
FIG. 16 is a diagrammatic representation of apparatus for maintaining the arrangement of the invention at a selected temperature at which the elements of the converter may be maintained in a superconductive state.

FIG. 16 is a diagrammatic illustration of an apparatus for maintaining the converter of the present invention at a suitable low temperature near absolute zero during its operation. In FIG. 16 there is shown an insulated container 74, for example of glass, adapted to hold a coolant such as liquid nitrogen 75. The liquid nitrogen 75 serves as a heat shield for an inner container 76 to be described. Within the container 74 there is suspended an inner insulated container 76 for holding a second coolant, such as liquid helium 77, for maintaining the converter of the invention at the proper operating temperature. The top of the inner container 76 is sealed by a sleeve 78 and lid 80. A conduit 82 connects the inner container 76 with a vacuum pump 84 through a pressure regulation valve 86. As is known, the boiling temperature of liquid helium is a function of the pressure of its ambient. Thus, control over the ambient pressure implies control over the temperature of the liquid helium 77. The pump 84 functions to lower the ambient or atmospheric pressure within the inner container 76 to provide control over the temperature of the liquid helium. The pressure regulation valve 86 functions to regulate the pressure within the inner container 76 so that the temperature is held constant.

The converter 18 of the invention may be suspended in the liquid helium 77 at the proper operating temperature. In order to obtain the benefits of high switching speeds it is preferred to maintain an operating temperature below the lambda point of helium. Connection to the converter 18 is made by a number of lead-in wires 88 which may also be constructed of a superconductive material to minimize resistance losses. The lead-in wires 88 extend through the lid 80 to terminals 90. One pair of lead-in wires may be used to apply an analog current to the converter 18 while the remaining wires may be used to derive the output voltages from the converter 18.

From the foregoing it is apparent that, by means of the teachings of the invention, an improved analog-to-digital converter may be provided, and one wherein the converter is characterized by high switching speeds, extreme compactness, and relatively great ease of manufacture.

What is claimed is:

1. A superconductive circuit for converting an analog input signal into a corresponding digital output signal, said circuit comprising: an array of series interconnected thin film superconductive circuit elements constructed to have, respectively, different critical current switching characteristics, with each of said elements having an electrical resistance in its resistive state of a value calculated to develop, in conjunction with its respective critical current switching characteristic, a predetermined voltage in said element when it is switched from superconductive to resistive state; input terminal means across which said elements are connected in series and adapted to feed said analog input signal thereto; and output terminal means connected to said array; said different characteristics of each of the elements of said array being such that, upon application of said analog input signal to said elements, each of said elements responds to change its superconductive resistive state at a respectively different current level of said analog input signal, whereby to develop at said output terminal means a voltage representing one condition of a digital output signal corresponding to said analog input signal when said input signal attains a predetermined current level, and whereby to extinguish said voltage at said output terminal means when said analog input signal falls below said current level, thereby to represent another condition of said digital output signal.

2. The circuit claimed in claim 1, wherein said superconductive elements are constructed to have different critical current switching values and different resistance values, with the critical current switching values being inversely proportional to the resistance values so that the voltages developed across said elements when they are switched to their resistive states are substantially equal.

3. The circuit claimed in claim 1, wherein said superconductive elements have different critical current values that are linearly related to each other so as to provide said circuit with a linear response characteristic.

4. The circuit claimed in claim 1, wherein said superconductive elements have different critical current values that are non-linearly related to each other so as to provide said circuit with a non-linear response characteristic.

5. A superconductive circuit for converting an analog input signal into a corresponding digital output signal, said circuit comprising: an array of series interconnected thin film superconductive circuit elements constructed to have, respectively, different critical current switching characteristics, with each of said elements having an electrical resistance in its resistive state of a value calculated to develop, in conjunction with its respective critical current switching characteristic, a predetermined voltage in said element when it is switched from superconductive to resistive state; input terminal means across which said elements are connected in series and adapted to feed said analog input signal thereto; and output terminal means connected to said array; said different characteristics of each of the elements of said array being such that, upon application of said analog input signal to said elements, each of said elements responds to change its superconductive-resistive state at a respectively different current level of said analog input signal, whereby to develop at said output terminal means a voltage representing one condition of a digital output signal corresponding to said analog input signal when said input signal attains a predetermined current level, and whereby to extinguish said voltage at said output terminal means when said analog input signal falls below said current level, thereby to represent another condition of said digital output signal; at least some of said elements being made of the same superconductive material and constructed to have mutually different width dimensions to endow them with different critical current switching characteristics.

6. A superconductive circuit for converting an analog input signal into a corresponding digital output signal, said circuit comprising: an array of series interconnected thin film superconductive circuit elements constructed to have, respectively, different critical current switching characteristics, with each of said elements having an electrical resistance in its resistive state of a value calculated to develop, in conjunction with its respective critical current switching characteristic, a predetermined voltage in said element when it is switched from superconductive to resistive state; input terminal means across which said elements are connected in series and adapted to feed said analog input signal thereto; and output terminal means connected to said array; said different characteristics of each of the elements of said array being such that, upon application of said analog input signal to said elements, each of said elements responds to change its superconductive-resistive state at a respectively different current level of said analog input signal, whereby to develop at said output terminal means a voltage representing one condition of a digital output signal corresponding to said analog input signal when said input signal attains a predetermined current level, and whereby to extinguish said voltage at said output terminal means when said analog input signal falls below said current level, thereby to represent another condition of said digital output signal; at least some of said elements being made of the same superconductive material and having different thickness dimensions to endow them with different critical current switching characteristics.

7. A superconductive circuit for converting an analog input signal into a corresponding digital output signal, said circuit comprising: an array of series interconnected thin film superconductive circuit elements constructed to have, respectively, different critical current switching characteristics, with each of said elements having an electrical resistance in its resistive state of a value calculated to develop, in conjunction with its respective critical current switching characteristic, a predetermined voltage in said element when it is switched from superconductive to resistive state; input terminal means connected to said array and adapted to feed said analog input signal thereto, and output terminal means across which said elements are connected in series; said different characteristics of each of the elements of said array being such that, upon application of said analog input signal to said elements, each of said elements responds to change its superconductive-resistive state at a respectively different current level of said analog input signal, whereby to develop at said output terminal means a voltage representing one condition of a digital output signal corresponding to said analog input signal when said input signal attains a predetermined current level, and whereby to extinguish said voltage at said output terminal means when said analog input signal falls below said current level, thereby to represent another condition of said digital output signal; at least some of said elements being made of mutually different superconductive material to endow them with different critical current switching characteristics.

8. An arrangement for converting an analog input signal into a corresponding digital output signal, said arrangement comprising: an array of series interconnected thin film superconductive circuit elements constructed to have, respectively, different critical current switching characteristics, with each of said elements having an electrical resistance in its resistive state of a value calculated to develop, in conjunction with its respective critical current switching characteristic, a predetermined voltage in said element when it is switched from superconductive to resistive state, input terminal means across which said elements are connected in series and adapted to feed said analog input signal thereto; output terminal means connected to said array; said different characteristics of each of the elements of said array being such that, upon application of said analog input signal to said elements, each of said elements responds to change its superconductive-resistive state at a respectively different current level of said analog input signal, whereby to develop at said output terminal means a voltage representing one condition of a digital output signal corresponding to said analog input signal when said input signal attains a predetermined current level, and whereby to extinguish said voltage at said output terminal means when said analog input signal falls below said current level, thereby to represent another condition of said digital output signal; and means connected to maintain said elements at a temperature below the lambda point of helium.

9. An arrangement for converting an analog input signal into a corresponding digital output signal, said arrangement comprising, in combination: an array of series interconnected thin film superconductive circuit elements constructed to have, respectively, different critical current switching characteristics, with each of said elements having an electrical resistance in its resistive state of a value calculated to develop, in conjunction with its respective critical current switching characteristic, a predetermined voltage in said element when it is switched from superconductive to resistive state; a source of analog input signal current connected to feed an analog input signal to said array in series; a current chopper connected in series with said source and said array to periodically interrupt the flow of signal current to said array; and output terminal means connected to said array; said different characteristics of each of the elements of said array being such that, upon application of said analog input signal to change its superconductive-resistive state at said elements, each of said elements responds to a respectively different current level of said analog input signal, whereby to develop at said output terminal means a voltage representing one condition of a digital output signal corresponding to said analog input signal when said input signal attains a predetermined current level, and whereby to extinguish said voltage at said output terminal means, when said analog input signal falls below said current level, thereby to represent another condition of said digital output signal.

10. An arrangement for converting an analog input signal into a corresponding digital output signal, said arrangement comprising, in combination: an array of series interconnected thin film superconductive circuit elements constructed to have, respectively, different critical current switching characteristics, with each of said elements having an electrical resistance in its resistive state of a value calculated to develop, in conjunction with its respective critical current switching characteristic, a predetermined voltage in said element when it is switched from superconductive to resistive state; input terminal means across which said elements are connected in series and adapted to feed said analog input signal thereto; output terminal means connected to said array; said different characteristics of each of the elements of said array being such that upon application of said analog input signal, to said elements, each of said elements responds to change its superconductive-resistive state at a respectively different current level of said analog input signal, whereby to develop at said output terminal means a voltage representing one condition of a digital output signal corresponding to said analog input signal when said input signal attains a predetermined current level, and whereby to extinguish said voltage at said output terminal means when said analog input signal falls below said current level, thereby to represent another condition of said digital output signal; and a bistable trigger circuit means coupled to each of said elements to sense the occurrence of said voltage developed in each of said elements.

11. An arrangement for converting an analog input signal into a corresponding digital output signal, said arrangement comprising, in combination: an array of series interconnected thin film superconductive circuit elements constructed to have, respectively, different critical current switching characteristics, with each of said elements having an electrical resistance in its resistive state of a value calculated to develop, in conjunction with its respective critical current switching characteristic, a predetermined voltage in said element when it is switched from superconductive to resistive state; input terminal means across which said elements are connected in series and adapted to feed said analog input signal thereto; output terminal means connected to said array; said different characteristics of each of the elements of said array being such that upon application of said analog input signal to said elements, each of said elements responds to change its superconductive-resistive state at a respectively different current level of said analog input signal, whereby to develop at said output terminal means a voltage representing one condition of a digital output signal corresponding to said analog input signal when said input signal attains a predetermined current level, and whereby to extinguish said voltage at said output terminal means when said analog input signal falls below said current level, thereby to represent another condition of said digital output signal; and voltage responsive means coupled to that element having the lowest critical current switching characteristic to sense the occurrence of voltage pulses across each of said elements; said voltage responsive means including a differentiating network for deriving a series of short duration voltage pulses representing the sequence in which said elements are switched, said differentiating network being connected to derive a pulse of one polarity each time an element switches from its superconductive to its resistive state and to derive a pulse of opposite polarity when said element switches from its resistive state to its superconductive state, and counter means connected to said differentiating network for combining said pulses and deriving an output signal that is a digital measure of the current level of said analog input signal.

12. An arrangement for converting an analog input signal into a corresponding digital output signal, said arrangement comprising, in combination: an array of electrically series connected thin film super-conductive circuit elements constructed to have, respectively, different critical current switching characteristics, with each of said elements having an electrical resistance in its resistive state of a value calculated to develop, in conjunction with its respective critical current switching characteristics, a predetermined voltage in said element when it is switched from superconductive to resistive state; input terminal means; a sawtooth wave current chopper electrically connected in series between said input terminal means and said array for converting an analog input signal applied to said input terminal means into a series of sawtooth current pulses and feeding said pulses to said element array; output terminal means connected to said array; said different characteristics of each of the elements of said array being such that, upon application of said analog input signal to said input terminal means, each of said elements responds to change its superconductive-resistive state at a respectively different current level of said analog input signal, whereby to develop at said output terminal means a voltage representing one condition of a digital output signal corresponding to said analog input signal when said input signal attains a predetermined current level, and whereby to extinguish said voltage at said output terminal means when said analog input signal falls below said current level, thereby to represent another condition of said digital output signal; a differentiator connected across said output terminal means to derive a first series of output pulses of one polarity representing the occurrence of said voltage at said output terminal means and a second series of pulses having a polarity opposite to that of said first series of pulses and representing the extinguishment of said voltage at said output terminal means; a first superconductive rectifier connected to said differentiator and biased to pass pulses of said first series; a second superconductive rectifier connected to said differentiator and biased to pass pulses of said second series; a counter connected to the output of said first rectifier to count the number of consecutive pulses in said first series occurring during each cycle of said sawtooth current, thereby to obtain a digital measure of the level of said analog input signal during said cycle; and a counter reset having an input circuit connected to the output of said second rectifier to receive said pulses of said second series and having an output circuit connected to de-energize said counter upon receipt by said counter reset of a pulse from said second series and to reset said counter for receipt of pulses of said first series.

References Cited in the file of this patent

UNITED STATES PATENTS

| | | |
|---|---|---|
| 2,659,043 | Taylor | Nov. 10, 1953 |
| 2,666,884 | Ericson et al. | Jan. 19, 1954 |
| 2,894,234 | Weiss et al. | July 7, 1959 |
| 2,931,024 | Slack | Mar. 29, 1960 |
| 2,936,435 | Buck | May 10, 1960 |
| 2,936,447 | Kinkead et al. | May 10, 1960 |
| 2,949,602 | Crowe | Aug. 16, 1960 |